US012561288B2

(12) United States Patent
Thakkar et al.

(10) Patent No.: US 12,561,288 B2
(45) Date of Patent: Feb. 24, 2026

(54) METHOD AND APPARATUS TO VERIFY FILE METADATA IN A DEDUPLICATION FILESYSTEM

(71) Applicant: Dell Products L.P., Round Rock, TX (US)

(72) Inventors: Smriti Thakkar, San Jose, CA (US); Tony T. Wong, Cary, NC (US); Pooja Mahadik, Pune (IN)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 17/813,218

(22) Filed: Jul. 18, 2022

(65) Prior Publication Data

US 2024/0020273 A1     Jan. 18, 2024

(51) Int. Cl.
*G06F 16/174*     (2019.01)
*G06F 16/13*     (2019.01)
*G06F 16/14*     (2019.01)

(52) U.S. Cl.
CPC ........ *G06F 16/1748* (2019.01); *G06F 16/137* (2019.01); *G06F 16/152* (2019.01)

(58) Field of Classification Search
CPC ... G06F 16/137; G06F 16/1748; G06F 16/152
See application file for complete search history.

(56) References Cited

U.S. PATENT DOCUMENTS

| | | | |
|---|---|---|---|
| 6,393,428 B1 | 5/2002 | Miller et al. | |
| 8,904,137 B1 * | 12/2014 | Zhang | G06F 3/067 |
| | | | 711/165 |
| 9,367,448 B1 | 6/2016 | Botelho et al. | |
| 10,108,544 B1 * | 10/2018 | Duggal | G06F 11/14 |
| 11,615,813 B1 | 3/2023 | Goker et al. | |
| 2013/0318051 A1 | 11/2013 | Kumar et al. | |
| 2016/0110261 A1 * | 4/2016 | Parab | G06F 16/174 |
| | | | 707/692 |
| 2018/0253438 A1 | 9/2018 | Zaydman | |
| 2019/0188184 A1 | 6/2019 | Chittaro et al. | |
| 2019/0272337 A1 | 9/2019 | Stewart et al. | |
| 2020/0019623 A1 * | 1/2020 | Wong | G06F 16/137 |
| 2020/0133719 A1 | 4/2020 | Chinthekindi et al. | |
| 2020/0133720 A1 | 4/2020 | Chinthekindi et al. | |
| 2020/0177390 A1 | 6/2020 | Yang et al. | |
| 2020/0250083 A1 * | 8/2020 | Shilane | G06F 3/0652 |
| 2020/0310686 A1 | 10/2020 | Truong et al. | |
| 2020/0310964 A1 | 10/2020 | Lu et al. | |
| 2020/0310965 A1 | 10/2020 | Brandt et al. | |
| 2020/0322159 A1 | 10/2020 | Xu et al. | |
| 2020/0328886 A1 | 10/2020 | Newton et al. | |

(Continued)

*Primary Examiner* — Marc S Somers
(74) *Attorney, Agent, or Firm* — Workman Nydegger

(57) ABSTRACT

One example method includes finding an Ln segment in a namespace, and adding the Ln segment to a fingerprint hashtable, scanning a container set and locating Ln in the container set, looking for Ln in the fingerprint hashtable, when Ln is found in the fingerprint hashtable, deleting Ln from the fingerprint hashtable, otherwise, retaining Ln in the fingerprint hashtable, when Ln is found in in the fingerprint hashtable, adding all fingerprints, pointed to by Ln, to the fingerprint hashtable, and when all levels of a tree that includes Ln have been checked, identifying as missing, any fingerprints still remaining in the fingerprint hashtable.

18 Claims, 4 Drawing Sheets

(56) References Cited

U.S. PATENT DOCUMENTS

| | | | |
|---|---|---|---|
| 2020/0374301 A1 | 11/2020 | Manevich et al. | |
| 2020/0382315 A1 | 12/2020 | Lakk | |
| 2021/0124716 A1* | 4/2021 | Chinthekindi | ........ G06F 16/188 |
| 2021/0374124 A1 | 12/2021 | Duggal et al. | |
| 2022/0326867 A1 | 10/2022 | Thakkar et al. | |
| 2022/0365695 A1 | 11/2022 | Zhang et al. | |
| 2024/0223381 A1 | 7/2024 | Hwang et al. | |
| 2024/0264752 A1 | 8/2024 | Carr | |

* cited by examiner

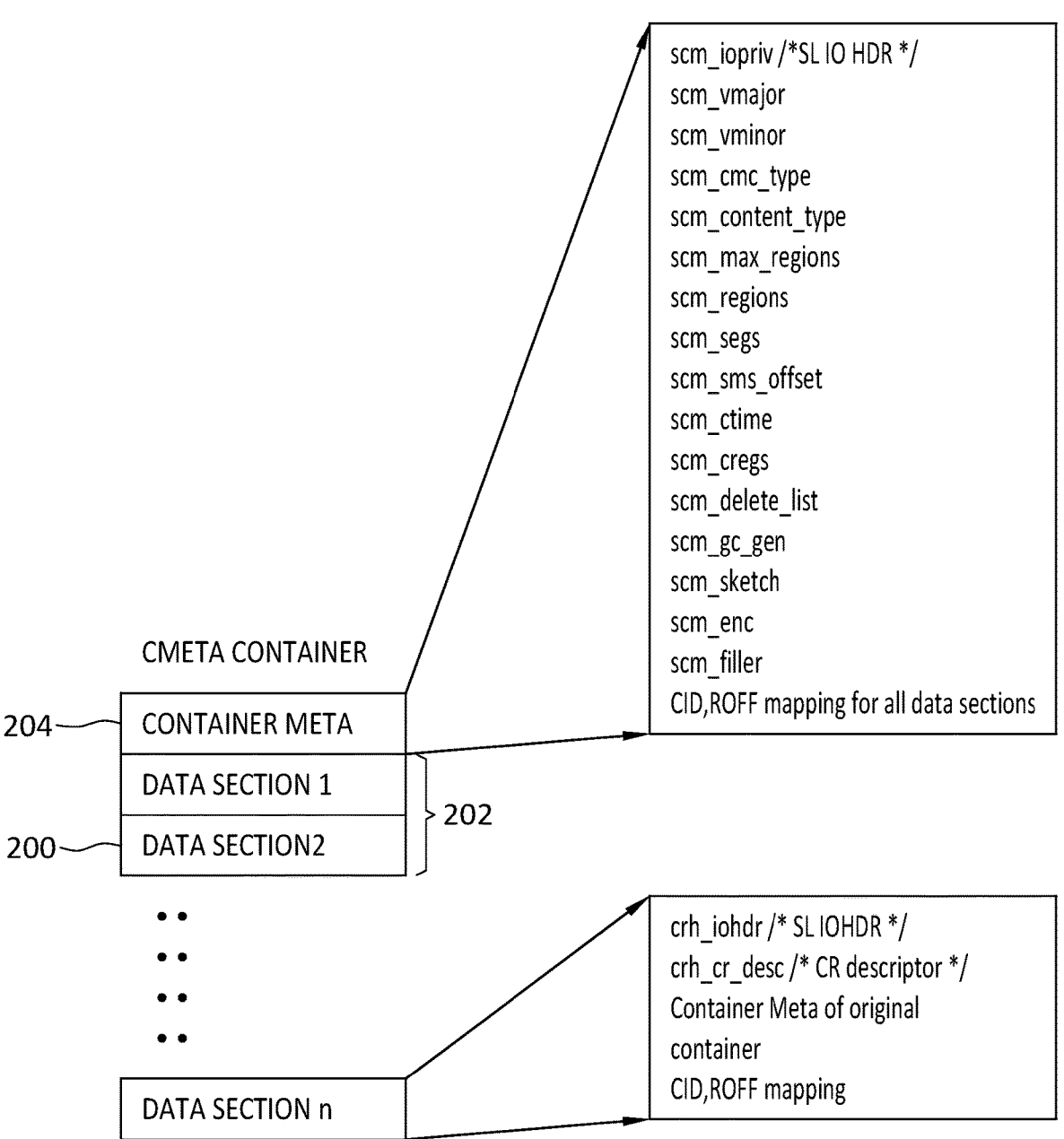

scm_iopriv /*SL IO HDR */
scm_vmajor
scm_vminor
scm_cmc_type
scm_content_type
scm_max_regions
scm_regions
scm_segs
scm_sms_offset
scm_ctime
scm_cregs
scm_delete_list
scm_gc_gen
scm_sketch
scm_enc
scm_filler
CID,ROFF mapping for all data sections

CMETA CONTAINER

204 —— CONTAINER META

DATA SECTION 1
}
} 202
DATA SECTION2

200 ——

DATA SECTION n crh_iohdr /* SL IOHDR */
crh_cr_desc /* CR descriptor */
Container Meta of original
container
CID,ROFF mapping

FIG. 2

METHOD AND APPARATUS TO VERIFY FILE METADATA IN A DEDUPLICATION FILESYSTEM

FIELD OF THE INVENTION

Embodiments of the present invention generally relate to data protection. More particularly, at least some embodiments of the invention relate to systems, hardware, software, computer-readable media, and methods for identifying files that are impacted by a data loss.

BACKGROUND

Data backup systems are typically the last resort for data recovery. If the primary copy of the data is lost, it is recovered from secondary storage, such as a data backup system. If the backup copy of the data is lost, it may not be possible to recover the lost data, since that is the last copy of the data. Hence, it is important for backup solutions to provide data protection and integrity capabilities. A data backup system such as Data Domain may provide data invulnerability architecture at every component in the file system to guard against data loss. However, if there is a data loss, all the missing segments need to be identified and listed, so that the impacted files can be identified and removed from the system. The backup copies of the impacted files can then be recovered from the primary system, or from a data replication system. However, it can be difficult, or impossible, to identify and list the missing segments and, thus, which files are impacted by the data loss.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
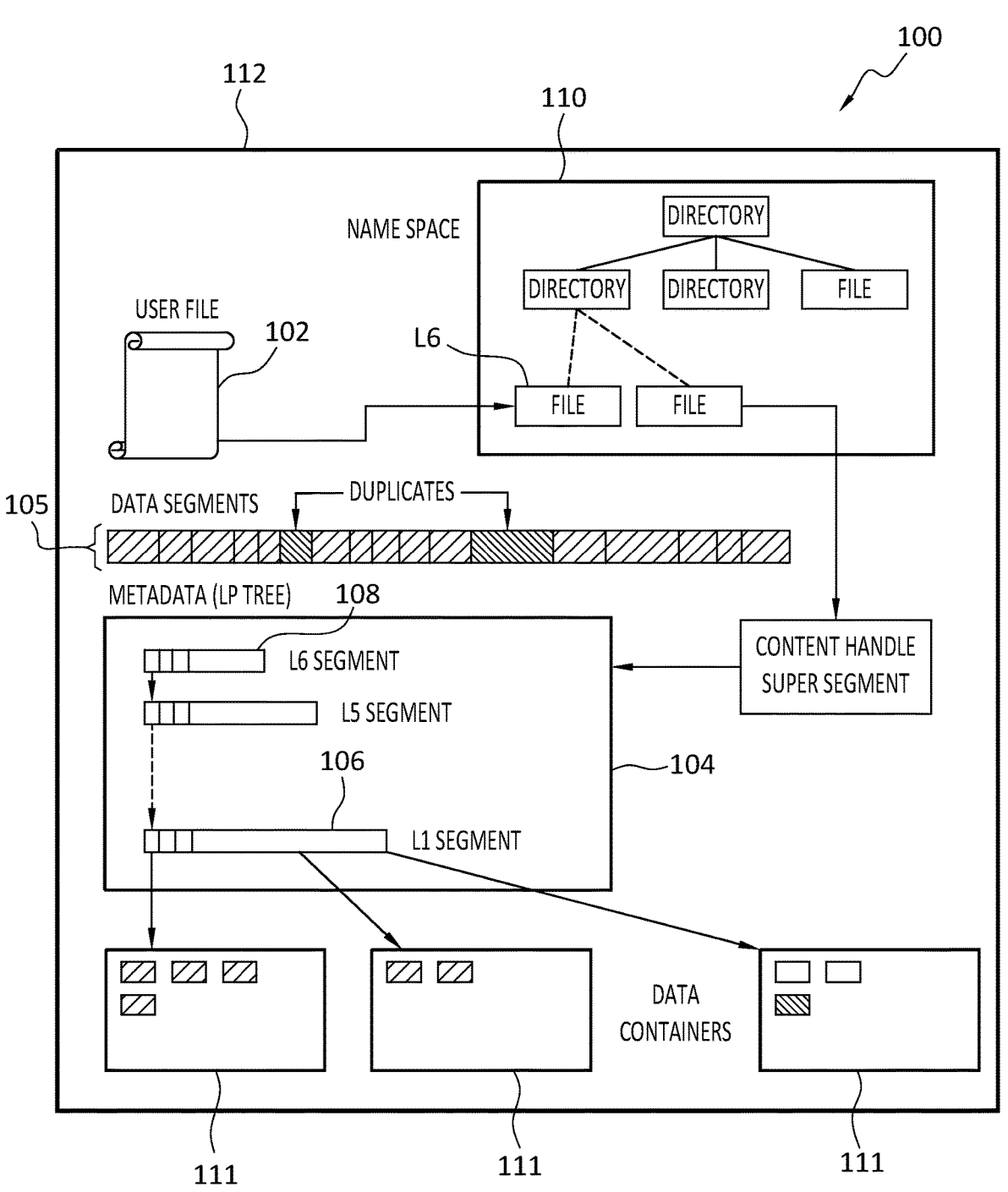
FIG. 1 discloses aspects of a data storage/backup approach according to some example embodiments FIG. 2 discloses aspects of an example container that may be employed in example embodiments.

Embodiments of the present invention generally relate to data protection. More particularly, at least some embodiments of the invention relate to systems, hardware, software, computer-readable media, and methods for identifying files that are impacted by a data loss. For example, some embodiments are directed to a method and apparatus that are operable to identify all the missing metadata segments in a deduplicated filesystem. By knowing which metadata segments are missing, it may be possible to then identify the file(s) impacted by a data loss. The identified files may then be removed from the filesystem, and their respective backups restored from a data protection system.

Some example embodiments of the invention are directed to an algorithm that is executable to verify metadata and identify missing data segments, or simply 'segments,' and the impacted files in the filesystem. The algorithm may employ a fingerprint hashtable as a data structure. The fingerprint (Fp) hashtable may include fingerprints, such as hashes for example, of the segments in a file. Data segment fingerprint inserts and deletes to this hashtable are $O(1)$ that is, the time for some embodiments of the algorithm to perform these operations is the same regardless of how many inserts or deletes are performed. As a result of a verification of fingerprints for data segments above the bottom level of a Merkle tree, that represents a file, the hashtable may be determined to contain live references, that is, fingerprints, that do not have the corresponding segments in the container set. These are the missing segments. The missing segments may then be used to identify a file that has been impacted by a data loss in the system. The impacted file may be removed from the system, and a backup copy of that file restored.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, one advantageous aspect of at least some embodiments of the invention is that an embodiment may perform a physical scan of a container set, rather than performing a logical verification for each file. Since this physical scan may be a breadth-first scan (BFS) rather than a depth-first scan (DFS), the BFS may avoid traversing duplicate segments repeatedly, so that the scan proceeds relatively more quickly than if a DFS were performed. An embodiment may operate to identify segments missing as a result of a data loss event, and may employ metadata about those segments to determine which files have been impacted by the data loss event. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a data-center which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Context for Some Example Embodiments

It is noted that while this disclosure may reference the Dell EMC Data Domain File System (DDFS), such reference is only by way of illustration, and is not intended to limit the scope of the invention in any way. Embodiments of the invention may be implemented in other data protection systems as well.

The DDFS is an inline data deduplication file system. As data gets written to the file system, DDFS breaks the data into variable sized segments, and a group of segments is packed into a compression region. Compression regions are grouped together and written as a container to disk. DDFS calculates fingerprint signatures for each segment using SHA1 algorithm, although other hash algorithms could be used. DDFS has an on-disk fingerprint index table, which maps each fingerprint to the container-id, that has the corresponding data segment. The container has a metadata section followed by a group of data sections. The data sections store the compression regions. The container metadata section stores the meta information of the container, that is, the container metadata section stores the total number of compression regions, the total number of segments, the fingerprint of each segment, and the encryption and compression information of the compression regions as well.

As shown in the example configuration 100 of FIG. 1, which discloses a segment tree representation of a file 102, the file 102 in the Data Domain File System (DDFS) is represented by a tree 104, which may be a Merkle tree, with user data as variable sized data segments 105 at the bottom level of the tree 104, referred to as L0 segments. The SHA1 fingerprints of the L0 segments are grouped together at the next higher level of the tree 104 to form new segments, referred to as L1 segments 106. SHA1 fingerprints of L1 segments are grouped together as L2 segments, and this continues up to the L6 segment, which represents the entire file 102. The top segment of the tree 104 is always an L6 segment 108, even though the L6 segment may refer to any lower numbered segments. Segments above L0, that is, segments at levels L1 through L5 of the tree 104, may be referred to as Lp chunks or metadata segments. The L6 segment 108 of every file 102 is stored in a namespace 110 which is represented as a B+ Tree. The L0 and Lp segments are written to separate containers, known as L0 and Lp containers. Some example containers are indicated at 111.

The storage unit that runs DDFS and stores data may be referred to as the active-tier 112. Data domain, and other data protection platforms, may have a cloud-tier capability that allows applications to move data from on-premise active-tier 112 to a cloud tier. In the example of DDFS, at least, a single namespace 110 spans both active and cloud tiers. One or more of the containers 111 may be a CMETA container, an example of which is disclosed at 200 in FIG. 2.

When a file is moved from active to cloud-tier, the location information of the file referring to cloud object storage is stored in the namespace 110. For cloud-tier, a container, referred to as a CMETA container 200, may be used which stores the metadata sections 202 of multiple L0 and Lp containers. DD (Data Domain) adopts a meta-separated architecture to store the metadata in the local storage, and the actual data in the cloud object store. The metadata is stored locally, rather than in the cloud, to avoid cloud reads during ingest for deduplication and during garbage collection for enumeration. The local metadata may comprise Lp containers and CMETA containers 200.

The L0 containers, whose metadata sections 202 may be stored in a CMETA container 200, are stored directly in the cloud. One cloud-tier approach stores each compression region of an L0 container as an individual object in the cloud. Another cloud-tier approach stores the entire L0 container as a single object in the cloud, thus substantially reducing the total number of objects in the cloud, by increasing the object size. FIG. 2 shows the CMETA 200 on-disk format. As shown in the CMETA on-disk format, the CMETA container 200 may store, in addition to the metadata sections 202 of multiple L0 and Lp containers, metadata 204 about the CMETA container 200 itself.

DDFS has a Data Invulnerability Architecture (DIA) that is used to ensure the integrity of data in the presence of software and hardware failures. As a part of this architecture, the filesystem has to ensure the integrity of segments, segment references, that is, references between segment levels of a tree such as the tree 104, and the fingerprint index (FP Index). Segments are stored inside containers, segment references are stored inside the metadata segments, that is, the LP segments, and the FP Index stores the mapping from the fingerprints to respective container IDs. A segment is considered to be a live segment if it is referenced by another live segment. Further, an L6 segment is considered to be live if there is a corresponding file in the namespace, that is, a file to which the L6 segment corresponds.

One way to maintain data integrity is to ensure that fingerprints in the FP Index have segments corresponding to them in containers, and to ensure that segment references stored inside meta-data segments point to segments inside the containers. Thus, DDFS maintains two DIA invariances: (1) there is a one-to-one mapping between the (segment, container) pair and the index; and (2) the segment should exist if there is a live reference to that segment. In some cases, inconsistency between the FP Index, segments, and/or references, can occur due to hardware or software bugs, for example.

Example embodiments of the invention may assume that a data protection system, such as DDFS for example, adheres to the DIA invariance (1), that is, there is another apparatus that finds inconsistencies between the FP Index and the container set. More particularly, DDFS periodically computes, such as during a garbage collection procedure, the entire FP Index checksum and compares that checksum against the segment checksum. A checksum mismatch is flagged by DDFS and the missing segments are identified by a separate procedure.

For the DIA invariance (2), embodiments may split the tree 104 verification into two independent methods, namely, (a) verifying the metadata, that is, the LP segments L1 through L6, and (b) verifying the L0 segments, that is, the data segments. As noted earlier, the tree 104 may be a Merkle tree, although that is not necessarily required.

In general, metadata segments typically constitute a smaller percentage of all the segments. Through telemetric data, for example, it is known that LP segments, that is, metadata segments, typically make up about 10-20% of the segments in a system, and the rest of the segments in the system are L0 segments, that is, data segments. For L0 segment verification, since all the segment references cannot fit in-memory because of the limited memory available on the DDR, slower disk IO incurring techniques may be employed for L0 verification. However, since the number of metadata segments is less than the number of L0 segments, embodiments may focus on verifying the metadata segments with relatively faster in-memory techniques. At least some example embodiments perform identification of missing metadata segments in both active, and cloud, tiers.

C. Aspects of Some Example Embodiments

In general, some example embodiments of the invention may assume that DIA invariance (1), discussed above, is adhered to. That is, the FP index and container set are in sync, and all fingerprints listed in the FP index are in the container set, and vice versa, that is, all fingerprints in the set of containers are listed in the FP index. Some example embodiments are directed to methods and algorithms that ensure that DIA invariance (2) holds for Lp metadata segments. In general, a live Lp segment should exist in the FP index and container metadata if there is a live reference to that Lp segment. If an Lp segment does not exist, methods according to example embodiments may operate to identify the missing segments, and to list the files impacted by the loss of that metadata segment and the associated data segment(s).

C.1 Identification of Missing Lp Segments

Figures 3A, 3B:
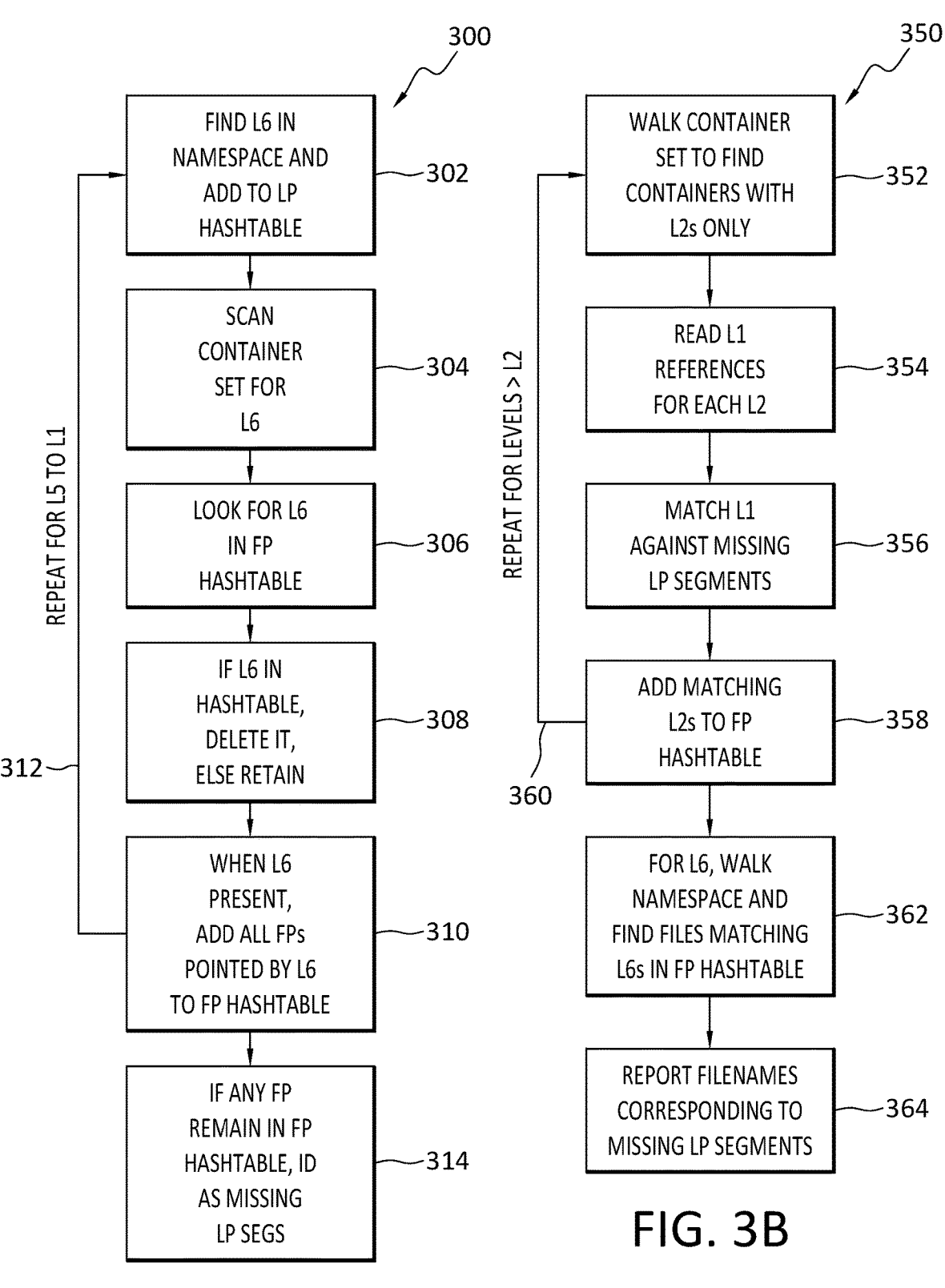
FIG. 3a discloses an example method for identifying missing segments.
FIG. 3b discloses an example method for identifying files to which missing segments correspond.

With attention now to FIG. 3*a*, aspects of an example method 300 for identifying missing Lp segments are disclosed. Note that the example method 300 assumes an Li segment tree level where $0<i<=6$, although larger/smaller values of i could be used, and the example method 300 further assumes that a directory manager, that is, a namespace, contains the references to L6s that are live inside the filesystem. Before performance of the method 300, or as part of that method 300, an embodiment may obtain a total count of Lp segments in a namespace, as well as the available RAM, and then use this information to calculate a fingerprint hashtable size. If enough RAM is available, a fingerprint hashtable, which may initially be empty, may be created in memory. At this point, the example method 300 may begin. The method 300 may be performed in a data deduplication environment that includes a local tier and/or a cloud storage tier. In some instances, the method 300 may be performed by a data deduplication server. In general however, no particular entity, or entities, are required to perform the method 300. Finally, it is noted that, as used herein, a 'fingerprint' such as may be created by hashing a data segment with a hashing algorithm is an example of a 'metadata segment.'

As shown in FIG. 3*a*, the method 300 may begin by walking 302 a directory manager, such as a namespace for example, finding any live L6 metadata segments, and then adding those live L6 metadata segments to an FP hashtable. Next, a container set may be scanned 304 for any L6 segments. The FP hashtable may then be checked 306 to determine if an L6 segment found at 304 is present in the FP hashtable. If so, the L6 segment may then be deleted 308 from the FP hashtable since it is known that (a) the L6 segments in the FP hashtable are live, and (b) the container set includes those L6 segments. Next, a determination may be made as to whether any of the Lp segments corresponding to the deleted L6 segment are missing or not. In particular, after the L6 segment has been deleted, the L6 segment may be read and all Lp segment references in that L6 segment added 310 into the FP hashtable. The operations 302-308 may then be successively repeated 312 for the L5, L4, L3, L2 and L1, segments.

Note that while a reference to a segment, such as from an L5 segment to an L4 segment for example, may exist, it is not necessarily the case that the L4 segment itself exists. That may not be known one way or the other until the L4 level is scanned.

If there are no missing fingerprints, that is, Lp metadata segments, then after all the container scans from L6 to L1, after inserts and deletions from the FP hashtable, the FP hashtable will be empty. On the other hand, if it is determined there are any missing fingerprints, then the FP hashtable will not be empty, and the fingerprints in the FP hashtable identified 314 as the missing fingerprints, or Lp metadata segments.

Note that the methods of FIGS. 3a and/or 3b may be performed entirely in-memory. However, performance of those methods is not limited to in-memory implementations.

C.2 Identification of Files Impacted by Missing Lp Segments

Once the missing segments have been identified 314, a method 350 may be used to identify the files to which the missing segments correspond. The method 350 may be performed immediately after completion of the method 300, or at any other time. In some embodiments, the methods 300 and 350 may be performed as a single continuous method. Further, the methods 300 and/or 350 may be performed automatically, possibly on an ad hoc basis, or on a regularly scheduled basis. As in the case of the method 300, the method 350 be performed in a data deduplication environment that includes a local tier and/or a cloud storage tier. In some instances, the method 350 may be performed by a data deduplication server. In general however, no particular entity, or entities, are required to perform the method 350.

The method 350 may begin by physically walking a container set 352 to read containers that contain L2s only. For each L2, the corresponding L1 references may be read 354 and compared against the missing segments in the FP hashtable to identify 356 any matches. For any L1s that match a missing segment in the FP table, the L2s to which those L1s correspond may then be added 358 to the FP table. The operations 352-358 may then be repeated 360 for all levels of the tree greater than L2, until L6 is reached. When L6 is reached, the namespace may be walked 362 to find the files corresponding to the L6s in the FP hashtable. For all these files, the filenames corresponding to the missing segments may then be reported 364.

With the example methods 300 and 350 in view, note that, for example, if the system needs to store, for example, 12 bytes of a fingerprint in the FP hashtable with 8 byte pointer overhead for every fingerprint, 5 billion Lp segments would require about 95 GB of memory space. There is enough memory on most DDR SD RAM to run the disclosed methods and algorithms. If there is not enough memory then, example embodiments may provide the following two options: (1) fall back to slower disk IO incurring existing techniques such as logical file verification and bulk file verification, for example; and (2) partition the L6 files, divide the namespace and verify the files in batches. This latter approach may require the disclosed verification methods to run multiple times.

Some particular examples of the methods 300 and 350 implemented in connection with an FP hashtable and a file representation are disclosed in Appendix A attached hereto.

Appendix A forms a part of this disclosure and is incorporated herein in its entirety by this reference.

D. Further Discussion

Example embodiments of the invention may provide various useful features and advantages. For example, an embodiment may be implemented as a complete in-memory solution to identify all the missing Lp segments and the impacted files. As another example, when compared to conventional techniques, no additional IOs are incurred are incurred when updating the fingerprint hashtable. This results in good performance. Further, an embodiment of the algorithm may perform a physical/breadth first scan (BFS) of the LP segments and may avoid verifying an L6 metadata segment multiple times even when that same L6 segment can be referenced by other segments due to deduplication. By avoiding multiple verifications of the L6 segment, embodiments may operate relatively quickly, and an LP segment verification may be complete in 2-3 hours. As a final example, embodiments may operate in a cloud storage tier and/or an active storage tier.

D. Example Methods

It is noted with respect to the disclosed methods, including the example method of FIGS. 3a and 3b, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Aspects of Some Alternative Embodiments

Some embodiments may perform a bulk file verification process that may involve verifying all the segments in the system by performing a physical scan of the container set rather than performing a logical verification for each file. This approach may scan the container set level by level from L6 to L0 to get the segment references and store the fingerprints in these segment references in memory. Then a check may be required to determine whether these fingerprints obtained from segment references exist in fingerprint Index or not. The Fp index may contain all the mapping of all the fingerprints to their container ID in the system. If the fingerprint is not found in the fingerprint index, then the fingerprint is missing. Once missing segments have been found, they may then be mapped to their corresponding files by walking the segment tree bottom-up.

Particularly, this approach may insert the fingerprints into in-memory hash table. When the hash table gets full, it may be dumped to disk. A set of these hash tables may be dumped to disk until the allotted space gets full. Then, a difference operation of these hash tables may be performed against the Fp index to find the missing segments. The difference operation may be performed by sequentially scanning the fingerprint Index and container set. A sequential scan may result in good performance.

The approach described above may dump the in-memory hash table to disk when it is full. However, there are situations where there is no available disk space, or the target dataset is small enough that it almost fits in memory. In such situations, an in-memory approach for verifying LP segments may be performed. Embodiments of an in-memory approach, such as is disclosed in the discussion of FIGS. 3a and 3b, may require buffer comparisons, which may need sorted buffers and additional optimizations. If there is not enough memory available, then this approach may fall back to a disk based approach.

F. Some Comparative Examples

Following are some comparative examples that may serve to further clarify and emphasize aspects of some example embodiments of the invention. These examples are provided for the purposes of comparison, and are not intended to limit the scope of the invention in any way.

F.1 Logical File Verification

To check the integrity between segment references, and segments in containers and an index, this approach may provide various checks and background activities running inside the filesystem. File verification may be one such background activity which may run inside a filesystem to ensure the correctness of mapping between segment references and segments, that is, a file verification process may ensure that all segments in the containers are reachable from its segment references. For any segments that are not reachable, a file verification process may report missing segments. If a segment is missing from the container set, and the index does not have a fingerprint corresponding to it, file verification may be used to catch such errors.

A logical file verification approach may be implemented where periodic snapshots are taken to find out the files that need to be verified. Snapshots may be taken at regular intervals and files changed or created between the snapshot diff may be candidates for verification. The file obtained during snapshot diff may be verified if it is closed, otherwise it may be skipped. For all the files that have changed in the snapshot diff, file verification may verify all the segments in the segment tree by doing a depth first walk for each segment. As will be apparent from this discussion, a logical file verification approach has significant limitations.

For example, this approach requires a segment tree walk to verify the reachability of pointers results in random lookups on disk. Random lookups on disk slow down verification performance. Further, an in index lookup is required for each reference, thereby contributing to more random IO overhead. Because of deduplication, the same segments have to be walked again and again, resulting in the same segments being verified again and again, which needlessly consumes processing resources, and takes time. In logical file verification, once a file has been verified, it will not be checked again due to its poor performance. However, data can be deleted accidentally by the garbage collection process and this kind of corruption will not be detected. On the cloud tier, logical file verification is not even enabled due to performance issues.

For at least the reasons noted above, logical file verification is quite slow. For example, whether employed in an active tier or cloud tier, metadata verification, such as is performed by example embodiments, may take weeks, or even months. Also, over time, this poor performance issue can been exacerbated due to various additional factors, one of which is increasing data storage capacities. In the current data centric world, the storage capacity requirements are increasing. A large capacity system is in the order of petabytes of data today. With the higher storage capacities, the number of data segments is the order of millions/billions. For example, in a 96 TB system, 8k avg segment size, is 12 billion fingerprints. And storage capacities have gone up to 1.5PB of data. Increased data storage capacities results in more fingerprints on the system, so the missing segment identifying algorithm has to do more work, making it even slower. In contrast, example embodiments may identify all the missing segments (L0 or Lp) quickly, with minimal disruption and with good performance to the customer.

F.2 Level by Level Checksum

Systems such as DDFS may compute the checksum of all the live references at each segment tree LP level and then that checksum compares against the checksum of all the segments referenced in the next segment tree level (Lp1). This tool incorporates a breadth first, physical scan of the containers to calculate the checksum. This tool takes a couple of hours to complete its operations. However, DDFS does not have enough memory to include the L0 segments in this procedure. This apparatus validates the live LP segment references. But once a checksum mismatch is detected, other, more time consuming tools, like logical verification have to be used to identify all the missing segments and the affected files in the system. Thus, level-by-level checksum verification has significant limitations at least insofar as it can only indicate that there is an inconsistency in the metadata segments, but does not identify the missing segments or the impacted files. That is, this approach provides only metadata checksum verification.

F.3 Physical File Verification

In this approach, a breadth first scan is performed, and then a physical scan of the containers in an attempt to improve on the disadvantages of logical file verification. This approach uses a data structure called PHVEC (perfect hash vector) to enumerate and mark all live references, iterate all the files in the namespace and insert the L6 references into the live vector, iterate all the L6 containers, if the L6 segment fingerprint is set in the live vector, read all its contents (L5 or below references), and insert them into the live vector. Repeat the above process for L5, L4, L3, L2, and L1 and L0 segments.

The physical file verification is similar to the enumeration procedure. The difference is that instead of inserting the contents of the segments into the live vector, the fingerprint of the segment itself is removed from the live vector. If there is no missing L0 segment, at the end of the verification phase, the entire live vector should be 0, else there is a missing Fp. However, some extra work is required to map the bits in the PHVEC to the missing fingerprints and more importantly, the corrupted files. The containers must be scanned again to map the missing bits back to the fingerprints.

A significant caveat when creating the PHVEC is that all the keys are predetermined and the bit positions are fixed. In DDFS, PHVEC keys are predetermined by iterating index. If there is a fingerprint missing from the Fp index, it can result in a collision. If the missing segment collides with an unused bit, the corruption will be detected. If the missing segment collides with some other live reference, the corruption will NOT be detected. Since there can be collisions in the PHVEC, some missing fingerprints will not be detected. Other procedures, such as logical file verification, must be invoked to perform a more comprehensive verification. However, this may add time, expense, and increased resource consumption.

G. Further Example Embodiments

Following are some further example embodiments of the invention. These are presented only by way of example and are not intended to limit the scope of the invention in any way.

Embodiment 1. A method, comprising: finding an Ln segment in a namespace, and adding the Ln segment to a fingerprint hashtable; scanning a container set and locating Ln in the container set; looking for Ln in the fingerprint hashtable; when Ln is found in the fingerprint hashtable, deleting Ln from the fingerprint hashtable, otherwise, retaining Ln in the fingerprint hashtable; when Ln is found in in the fingerprint hashtable, adding all fingerprints, pointed to by Ln, to the fingerprint hashtable; and when all levels of a tree that includes Ln have been checked, identifying as missing, any fingerprints still remaining in the fingerprint hashtable.

Embodiment 2. The method as recited in embodiment 1, wherein a value of n ranges from 1 to 6, and the tree comprises a Merkle tree.

Embodiment 3. The method as recited in any of embodiments 1-2, wherein each fingerprint is a hash of a respective data segment that resides at a bottom level of the tree.

Embodiment 4. The method as recited in any of embodiments 1-3, wherein the namespace spans a local storage tier and a cloud storage tier.

Embodiment 5. The method as recited in any of embodiments 1-4, wherein the missing fingerprints indicate that a data loss has occurred.

Embodiment 6. The method as recited in any of embodiments 1-5, wherein the levels of the tree are checked from a top of the tree to a bottom of the tree.

Embodiment 7. The method as recited in any of embodiments 1-6, further comprising using the missing fingerprints to identify a file that includes data segments to which the fingerprints correspond.

Embodiment 8. The method as recited in any of embodiments 1-7, wherein a top segment of the tree comprises a hash of an entire file, and the file is identified by walking the namespace and matching the file to the top segment.

Embodiment 9. The method as recited in embodiment 8, wherein the file is identified as missing one or more data segments.

Embodiment 10. The method as recited in any of embodiments 1-9, wherein there is a one-to-one mapping between a [segment, container] pair and a fingerprint index, and a segment exists if there is a live reference to that segment.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
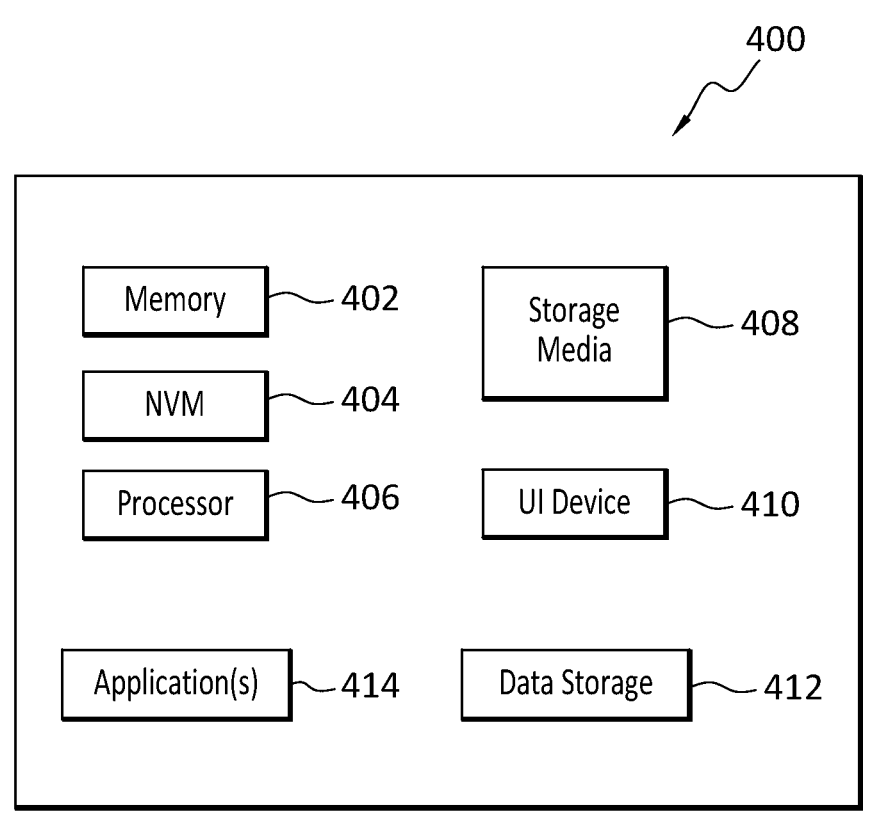
FIG. 4 discloses aspects of an example computing entity operable to perform any of the disclosed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI (user interface) device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
repeating following operations by decreasing 'n' in Ln from 6 to 1:
    finding a Ln metadata segment in a namespace, and adding the Ln metadata segment, which is a fingerprint, to a fingerprint hashtable;
    scanning a container set and locating a Ln segment in the container set;
    looking for a fingerprint corresponding to the Ln segment in the fingerprint hashtable;
    when the fingerprint corresponding to the Ln segment is found in the fingerprint hashtable:

deleting the corresponding fingerprint from the fingerprint hashtable; and
        adding all fingerprints, which are from the Ln segment corresponding to the deleted fingerprint, to the fingerprint hashtable; and
    while adding the all fingerprints, if a duplicate fingerprint is found, not adding the duplicate fingerprint to the fingerprint hashtable; and
when all levels of a tree that includes Ln metadata segments have been checked, identifying, as missing, any fingerprints still remaining in the fingerprint hashtable.

2. The method as recited in claim 1, wherein each fingerprint is a hash of a respective data segment that resides at a bottom level of the tree.

3. The method as recited in claim 1, wherein the namespace spans a local storage tier and a cloud storage tier.

4. The method as recited in claim 1, wherein the missing fingerprints indicate that a data loss has occurred.

5. The method as recited in claim 1, wherein the levels of the tree are checked from a top of the tree to a bottom of the tree.

6. The method as recited in claim 1, further comprising using the missing fingerprints to identify a file that includes data segments to which the missing fingerprints correspond.

7. The method as recited in claim 1, wherein a top segment of the tree comprises a hash of an entire file, and the file is identified by walking the namespace and matching the file to the top segment.

8. The method as recited in claim 7, wherein the file is identified as missing one or more data segments.

9. The method as recited in claim 1, wherein there is a one-to-one mapping between a pair and a fingerprint index, and
a segment exists if there is a live reference to that segment.

10. A non-transitory storage medium having stored therein instructions that are executable by one or more hardware processors to perform operations comprising:
repeating following operations by decreasing 'n' in Ln from 6 to 1:
    finding a Ln metadata segment in a namespace, and adding the Ln metadata segment, which is a fingerprint, to a fingerprint hashtable;
    scanning a container set and locating a Ln segment in the container set;
    looking for a fingerprint corresponding to the Ln segment in the fingerprint hashtable;
    when the fingerprint corresponding to the Ln segment is found in the fingerprint hashtable:
        deleting the corresponding fingerprint from the fingerprint hashtable; and
        adding all fingerprints, which are from the LN Ln segment corresponding to the deleted fingerprint, to the fingerprint hashtable; and
    while adding the all fingerprints, if a duplicate fingerprint is found, not adding the duplicate fingerprint to the fingerprint hashtable; and
when all levels of a tree that includes Ln metadata segments have been checked, identifying, as missing, any fingerprints still remaining in the fingerprint hashtable.

11. The non-transitory storage medium as recited in claim 10, wherein each fingerprint is a hash of a respective data segment that resides at a bottom level of the tree.

12. The non-transitory storage medium as recited in claim 10, wherein the namespace spans a local storage tier and a cloud storage tier.

13. The non-transitory storage medium as recited in claim 10, wherein the missing fingerprints indicate that a data loss has occurred.

14. The non-transitory storage medium as recited in claim 10, wherein the levels of the tree are checked from a top of the tree to a bottom of the tree.

15. The non-transitory storage medium as recited in claim 10, wherein the operations further comprise using the missing fingerprints to identify a file that includes data segments to which the missing fingerprints correspond.

16. The non-transitory storage medium as recited in claim 10, wherein a top segment of the tree comprises a hash of an entire file, and the file is identified by walking the namespace and matching the file to the top segment.

17. The non-transitory storage medium as recited in claim 16, wherein the file is identified as missing one or more data segments.

18. The non-transitory storage medium as recited in claim 10, wherein there is a one-to-one mapping between a pair and a fingerprint index, and a segment exists if there is a live reference to that segment.

\* \* \* \* \*